United States Patent
Xie (10) Patent No.: US 11,638,908 B2
(45) Date of Patent: May 2, 2023

(54) POTASSIUM-MERLINOITE ZEOLITE, ITS SYNTHESIS AND USE

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/877,593

(22) Filed: Jul. 29, 2022

(65) Prior Publication Data

US 2022/0362740 A1    Nov. 17, 2022

Related U.S. Application Data (62) Division of application No. 16/833,841, filed on Mar. 30, 2020, now Pat. No. 11,465,122.

(Continued)

(51) Int. Cl.
*B01J 20/18*       (2006.01)
*B01D 53/04*       (2006.01)
(Continued)

(52) U.S. Cl.
CPC .......... *B01J 20/186* (2013.01); *B01D 53/047* (2013.01); *B01D 53/0462* (2013.01); *B01D 53/228* (2013.01); *B01D 53/229* (2013.01); *B01D 69/147* (2013.01); *B01D 71/028* (2013.01); *B01D 71/0281* (2022.08); *B01J 20/28011* (2013.01); *B01J 20/3085* (2013.01); *C01B 32/50* (2017.08); *C01B 39/026* (2013.01); *C01B 39/46* (2013.01); *C10L 3/104* (2013.01); *B01D 2253/108* (2013.01); *B01D 2257/504* (2013.01);
(Continued)

(58) Field of Classification Search
CPC ................ B01J 20/186; B01J 20/28011; B01J 20/3085; C01B 32/50; C01B 39/026; C01B 39/46; B01D 53/0462; B01D 53/047; B01D 53/229; B01D 71/028
See application file for complete search history.

(56) References Cited

U.S. PATENT DOCUMENTS 3,012,853 A     12/1961 Milton
4,503,024 A *   3/1985 Bourgogne ......... C01B 33/2869
                                              423/DIG. 25

FOREIGN PATENT DOCUMENTS

JP    2006-150239      6/2006
JP    2006150239 A *   6/2006    ............. B01D 71/02
(Continued)

OTHER PUBLICATIONS

Houlleberghs et al. (Evolution of the crystal growth mechanism of zeolite W (MER) with temperature, published on Sep. 12, 2018, Microporous and Mesoporous Materials, vol. 274, pp. 379-384) (Year: 2018).*

(Continued)

*Primary Examiner* — Youngsul Jeong
(74) *Attorney, Agent, or Firm* — E. Joseph Gess; Melissa M. Hayworth; Terrence M. Flaherty (57) ABSTRACT

The present disclosure is directed to a potassium-form MER framework type zeolite, a MER framework type zeolite having a stick-like morphology, wherein the potassium is (Continued)

present as K⁺ in extra-framework locations. The zeolite is essentially free of an extra-framework cation other than potassium.

7 Claims, 4 Drawing Sheets

Related U.S. Application Data (60) Provisional application No. 62/883,835, filed on Aug. 7, 2019.

(51) Int. Cl.

| | | |
|---|---|---|
| *C01B 32/50* | (2017.01) | |
| *B01D 53/047* | (2006.01) | |
| *B01D 53/22* | (2006.01) | |
| *B01D 71/02* | (2006.01) | |
| *B01J 20/28* | (2006.01) | |
| *B01J 20/30* | (2006.01) | |
| *C01B 39/02* | (2006.01) | |
| *C01B 39/46* | (2006.01) | |
| *C10L 3/10* | (2006.01) | |
| *B01D 69/14* | (2006.01) | |

(52) U.S. Cl.
CPC .......... *B01D 2259/401* (2013.01); *C01B 2210/0018* (2013.01); *C01B 2210/0051* (2013.01); *C01P 2002/72* (2013.01); *C01P 2004/03* (2013.01); *C10L 2290/542* (2013.01)

(56) References Cited

FOREIGN PATENT DOCUMENTS

| KR | 10-2018-0051455 | | 5/2018 | | |
|---|---|---|---|---|---|
| KR | 20180051455 A | * | 5/2018 | ............. | B01D 53/04 |

OTHER PUBLICATIONS

Skofteland et al. (Potassium merlinonite: crystallization, structural and thermal properties, 2001, Microporous and mesoporous materials, vol. 43, pp. 61-71) (Year: 2001).*
JP-2006150239-A_English (Year: 2006).*
KR 20180051455A_English (Year: 2018).*
KR 10-2018-0051455_English Translation (Year 2018).
JP-2006150239-A_English Translation (Year 2006).
R.M. Barrer and J.W. Baynham "The Hydrothermal Chemistry of the Silicates. Part VII. Synthetic Potassium Muminosilicates" J. Chem. Soc. 1956, 2882-2891.
J.D. Sherman "Identification and Characterization of Zeolites Synthesized in the K2O—Al2O3—SiO2—H2O System" ACS Symposium Series, 1977, 40, 30-42.
A.A. Belhekar, A.J. Chandwadkar and S.G. Hegde "Physicochemical characterization of a synthetic merlinoite (Linde W-like) zeolite containing Na, K, and Sr cations" Zeolites 1995, 15, 535-539.
A. Bieniok, K. Bornholdt, U. Brendel and W.H. Baur "Synthesis and crystal structure of zeolite W, resembling the mineral merlinoite" J. Mater. Chem. 1996, 6, 271-275.
B.M. Skofteland, O.H. Ellestad and K.P. Lillerud "Potassium merlinoite: crystallization, structural and thermal properties" Micropor. Mesopor. Mater 2001, 43, 61-71.
L. Van Tendeloo, E. Gobicheya, E. Breynaert, J.A. Martens and C.E.A. Kirschhock "Alkaline cations directing the transformation of FAU zeolites into five different framework types" Chem. Commun. 2013, 49, 11737-11739.
V.M. Georgieva, EL Bruce, M.C. Verbraeken, A.R. Scott, W.J. Casteel Jr., S. Brandani and P.A. Wright "Triggered Gate Opening and Breathing Effects during Selective CO2 Adsorption by Merlinoite Zeolite" J. Am. Chem. Soc. 2019, 141, 12744-12759.
PCT International Search Report, International Patent Appl. No. PCT/IB2020/053006, dated Jul. 8, 2020.

* cited by examiner

POTASSIUM-MERLINOITE ZEOLITE, ITS SYNTHESIS AND USE

CROSS-REFERENCE TO RELATED APPLICATIONS

This application is a divisional of U.S. patent application Ser. No. 16/833,841, filed Mar. 30, 2020, which claims priority to and the benefit of U.S. Provisional Application Ser. No. 62/883,835, filed Aug. 7, 2019, the contents of which are hereby incorporated by reference in their entireties.

FIELD

This disclosure relates to a MER framework type zeolite with improved morphology, its synthesis and its use in sorptive separations, such as the selective separation of carbon dioxide from methane.

BACKGROUND

Zeolites are microporous crystalline materials formed by a matrix of $TO_4$ tetrahedrons that share all their vertices giving rise to a three-dimensional structure that contains channels and/or cavities of molecular dimensions. Zeolites are of variable composition, and T generally represents atoms with formal oxidation state +3 or +4, such as Si, Ge, Ti, B, Al, or Ga. When some of the T atoms have an oxidation state less than +4, the crystalline matrix formed presents negative charges that are compensated by means of the presence in the channels or cavities of organic or inorganic cations.

Zeolites have found a wide range of applications within refinery processes and other processes for manipulating petroleum streams. Some zeolite applications are catalytic in nature, while other applications focus on the ability of zeolites to selectively adsorb molecules within a gas stream.

One example of selective adsorption of molecules from a gas phase stream is using a zeolite or another microporous material to remove contaminants from a stream containing hydrocarbons or other small gas phase organic molecules. For example, many natural gas streams contain at least some $CO_2$ in addition to the desired $CH_4$. Additionally, many refinery processes generate a gas phase output that includes a variety of species, such as $CH_4$ and $CO_2$, that are gases at standard temperature and pressure. Performing a separation on a gas phase stream containing $CH_4$ can allow for removal of an impurity and/or diluent such as $CO_2$ under controlled conditions. Such an impurity or diluent can then be directed to other processes, such as being directed to another use that reduces the loss of greenhouse gases to the environment.

There is a continuing need in the art for zeolite materials that enable effective capture of $CO_2$ from multi-component process streams containing $CO_2$.

SUMMARY

In one aspect, there is provided a method of synthesizing a MER framework type zeolite, the method comprising (a) providing a reaction mixture comprising: (1) a FAU framework type zeolite; (2) a source of potassium cations; (3) a source of hydroxide ions; and (4) water; and (b) subjecting the reaction mixture to crystallization conditions sufficient to convert the FAU framework type zeolite to a MER framework type zeolite.

In another aspect, there is provided a potassium-form MER framework type zeolite having a stick-like morphology, wherein the potassium is present as $K^+$ in extra-framework locations and the zeolite is essentially free of an extra-framework cation other than potassium.

In a further aspect, there is provided a process for separating $CO_2$ from a process feedstream, comprising: (a) contacting an adsorbent bed comprising a potassium-form MER framework type zeolite with a process feedstream comprising $CO_2$ and a second component comprising one or more of $CH_4$ and $N_2$ at a first pressure and first temperature; (b) adsorbing at least a portion of the $CO_2$ in the adsorbent bed; (c) producing a $CO_2$-lean product stream, wherein the $CO_2$-lean product stream has a lower concentration of $CO_2$ by vol. % than the process feedstream; and (d) producing a $CO_2$-rich product stream at a second pressure and second temperature, wherein the $CO_2$-rich product stream has a higher concentration of $CO_2$ by vol. % than the process feedstream; wherein the potassium-form MER framework type zeolite has a stick-like morphology, the potassium is present as $K^+$ in extra-framework locations, and the zeolite is essentially free of an extra-framework cation other than potassium.

In yet a further aspect, there is provided a process for separating $CO_2$ from a gaseous process feedstream, comprising: (a) contacting a first side of a membrane comprised of an a potassium-form MER framework type zeolite with a gaseous process feedstream comprising $CO_2$ and a second component comprising one or more of $CH_4$ and $N_2$ at a first pressure and first temperature; (b) collecting a first permeate stream from a second side of the membrane at a second pressure and a second temperature, wherein the first permeate stream consists of components that selectively permeate through the membrane and the first permeate stream has a higher concentration of $CO_2$ by vol. % than the process feedstream; and (c) collecting a first retentate stream, wherein the first retentate stream has a lower concentration of $CO_2$ by vol. % than the process feedstream; wherein the potassium-form MER framework type zeolite has a stick-like morphology, the potassium is present as $K^+$ in extra-framework locations, and the zeolite is essentially free of an extra-framework cation other than potassium.

DETAILED DESCRIPTION

Definitions

The term "framework type" as used herein has the meaning described in the "*Atlas of Zeolite Framework Types*" by Ch. Baerlocher, L. B. McCusker and D. H. Olson (Elsevier, Sixth Revised Edition, 2007).

As used herein, the term "MER-type zeolite" encompasses and is synonymous and interchangeable with the term "MER framework type zeolite".

The term "as-synthesized" refers to a zeolite in its form directly after crystallization, wherein after optional isolation and optional purification and optional dehydration thereof, the zeolite has not been subjected to a metal doping process such as a subsequent ion-exchange or impregnation method.

The term "primary crystal" denotes a single, indivisible crystal in contrast to an agglomerate. Primary crystals can adhere together through weak physical interactions (rather than chemical bonds) to form agglomerates. The words "crystal" and "crystallite" are used herein interchangeably.

The term "aspect ratio" is defined as the ratio of the largest crystalline dimension divided by the smallest crystalline dimension.

Synthesis of the Zeolite

A MER framework type zeolite can be synthesized by: (a) providing a reaction mixture comprising (1) a FAU framework type zeolite; (2) a source of potassium cations; (3) a source of hydroxide ions; and (4) water; and (b) subjecting the reaction mixture to crystallization conditions sufficient to convert the FAU framework type zeolite to a MER framework type zeolite.

The reaction mixture can have a composition, in terms of molar ratios, within the ranges set forth in Table 1:

TABLE 1

| Reactants | Useful | Preferred |
|---|---|---|
| $SiO_2/Al_2O_3$ | 4 to 10 | 4 to 7 |
| $[K^+]/SiO_2$ | 0.30 to 0.80 | 0.50 to 0.70 |
| $[OH^-]/SiO_2$ | 0.30 to 0.80 | 0.50 to 0.70 |
| $H_2O/SiO_2$ | 5 to 20 | 5 to 15 |

The FAU framework type zeolite can be zeolite Y. The zeolite can be in its ammonium-form, hydrogen-form, or alkali metal-form (e.g., $NH_4^+$-zeolite Y, $H^+$-zeolite Y, $Na^+$-zeolite Y). The FAU framework type zeolite can comprise two or more zeolites. The two or more zeolites can have different silica-to-alumina ratios. The FAU framework type zeolite can be the only silica and aluminum source in the reaction mixture to form the MER framework type zeolite.

The potassium cation is typically associated with anions which can be any anion that is not detrimental to the formation of the zeolite. Representative anions include hydroxide, halides (e.g., fluoride, chloride, bromide and iodide), sulfate, tetrafluoroborate, carboxylates (e.g., acetate, oxalate), and the like. In some aspects, the source of potassium cations comprises or is potassium hydroxide.

The reaction mixture can contain seeds of a MER framework type zeolite, such as zeolite W, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of the desired molecular sieve phase over any undesired phases.

Crystallization of the desired zeolite from the above reaction mixture can be carried out under either static, tumbled or stirred conditions in a suitable reactor vessel, such as polypropylene jars or Teflon-lined or stainless steel autoclaves, at a temperature (e.g., 125° C. to 200° C., 130° C. to 170° C., or 140° C. to 160° C.) for a time sufficient for crystallization to occur at the temperature used (e.g., 36 to 96 hours, or 36 to 72 hours, or 36 to 60 hours). Crystallization is usually conducted in an autoclave so that the reaction mixture is subject to under autogenous pressure.

Once the desired zeolite crystals have formed, the solid product can be recovered from the reaction mixture by standard mechanical separation techniques such as centrifugation or filtration. The recovered crystals can be water-washed and then dried to obtain the as-synthesized zeolite crystals. The zeolite crystals can be dried at an elevated temperature (e.g., 75° C. to 150° C.) for several hours (e.g., about 4 to 24 hours). The drying step can be performed under vacuum or at atmospheric pressure.

The present MER framework type zeolite, when employed as a sorbent, should be dehydrated (activated), at least partially. The dehydration can be done by heating the zeolite to a temperature in a range of 150° C. to 370° C., in an oxidative or inert atmosphere (such as air or nitrogen, respectively) and at atmospheric, sub-atmospheric or super-atmospheric pressures for between 30 minutes and 48 hours. Dehydration can also be performed at room temperature (e.g., 20° C. to 25° C.) by placing the zeolite crystals in a vacuum, but a longer time is required to obtain a sufficient amount of dehydration.

Optionally, the crystals can be calcined at a temperature of 400° C. to 900° C. (e.g., 400° C. to 650° C.) for approximately 0.1 to 8 hours (e.g., 1 to 4 hours). To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor to exit the crystal structure while reducing/minimizing damage and/or morphology changes in the crystals.

The zeolite can be used in processes of the present disclosure without calcination.

Characterization of the Zeolite

The present MER framework type zeolite can have molar ratio of $SiO_2/Al_2O_3$ in a range of from 4 to 10 (e.g., 4 to 7).

The MER framework type zeolite, in its as-synthesized form, contains potassium cations disposed in the zeolite as an extra-framework metal. An "extra-framework metal" is one that is located within the zeolite and/or on at least a portion of the zeolite surface and does not include atoms constituting the framework of the zeolite. The amount of extra-framework potassium cations can depend on many factors, including the composition of the reaction mixture and the framework aluminum content of the zeolite, but may be up to about 5 wt. % (e.g., up to 4 wt. %, up to 3 wt. %, up to 2 wt. %, or up to about 1 wt. %) on an anhydrous basis, based on the weight of the zeolite. The content of extra-framework potassium cations can be, on an anhydrous basis, at least 0.1 wt. % (e.g., at least 0.2 wt. %, at least 0.25 wt. %, at least 0.3 wt. %, at least 0.4 wt. %, or at least about 0.5 wt. %), based on the weight of the zeolite.

The MER framework type zeolite can be free or essentially free of an extra-framework cation other than potassium (e.g., organic cations, non-potassium alkali metal cations such as lithium, sodium and rubidium, and alkaline earth metal cations such as magnesium, calcium and strontium). As used herein, the term "essentially free" with respect to a cation means that the material does not have an appreciable amount of the particular cation. That is, the particular cation is not present in amount that would affect the basic physical and/or chemical properties of the material, particularly with respect to the material's capacity to selectively sorb carbon dioxide. For example, the zeolite may contain, on an anhydrous basis, less than about 0.1 wt. % (e.g., less than 0.08 wt. %, less than 0.05 wt. %, no more than 0.03 wt. %, less than 0.01 wt. %, or no detectable amount) of an extra-framework cation other than potassium, based on the weight of the zeolite.

The present MER framework type zeolite can be used without a post-synthesis metal exchange (e.g., ion exchange, impregnation) of potassium cations for other cations.

Powder XRD patterns of the zeolite prepared according to the presently described method correspond to those exhibited by MER framework type zeolites (i.e., the d-spacings and relative intensities correspond to those of a substantially pure MER-type zeolite). Powder XRD patterns representative of MER framework type zeolites can be referenced in the "*Collection of Simulated XRD Powder Patterns for Zeolites*" by M. M. J. Treacy and J. B. Higgins (Elsevier, Fifth Revised Edition, 2007). The powder XRD patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

While powder XRD can be used to establish the identity of a given zeolite, it cannot typically be used to distinguish a particular morphology. In order to distinguish between different morphologies, it may be necessary to use an analytical tool with greater resolution, such as scanning electron microscopy (SEM), photomicrographs from which can be used to identify crystals with different morphologies.

The foregoing synthetic method can result in zeolite crystals of uniform size and shape with relatively low amounts of agglomeration. The primary crystals can have a stick-like or elongated shape. The primary crystals typically have a mean aspect ratio of at least 2 (e.g., 2 to 6). The mean aspect ratio can be determined using the microscopy methods described below. The zeolite crystals are mainly in the form of primary crystals (i.e., non-agglomerated primary crystals), that is at least 90% (e.g., at least 95%, at least 99%) of the zeolite crystals are in the form of primary crystals. The percentage of non-agglomerated primary crystals can be determined using the microscopy methods described below.

The synthetic method can result in zeolite primary crystals having a mean crystal size of least 1 μm (e.g., 1 to 10 μm, 1 to 9 □m, 1 to 8 μm, 1 to 7 □m, 1 to 6 μm, 1 to 5 □m, 2 to 10 μm, 2 to 9 μm, 2 to 8 μm, 2 to 7 μm, 2 to 6 μm, or 2 to 5 □m). Crystal size is the length of the longest diagonal of the three-dimensional crystal. The mean size of smallest crystalline dimension of the primary crystals can be in a range of 0.8 to 1.2 □m (e.g., 0.9 to 1.1 □m).

Direct measurement of the crystal size can be performed using microscopy methods, such as SEM and TEM. For example, measurement by SEM involves examining the morphology of materials at high magnifications (e.g., 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of a straight edge are measured and recorded. (Particles that are clearly large polycrystalline aggregates should not be included the measurements.) Based on these measurements, the arithmetic mean of the sample crystal sizes is calculated.

In addition, the zeolite crystals can have a substantially stick-like or elongated morphology, such as at least at least 80% (at least 90%, at least 95%, or at least 99%) of the primary crystals having a stick-like or elongated morphology. The percentage of primary crystals having a morphology can be determined by counting based on, for example, SEM micrographs.

By virtue of their large and uniform size, MER framework type zeolite crystals produced by the present method can be particularly useful as sorbents, for example for selectively removing carbon dioxide from a mixture carbon dioxide and hydrocarbons such as methane.

Separation of $CO_2$ from Process Feedstreams

The MER-type zeolite can be used to separate carbon dioxide ($CO_2$) from a second component in gaseous process feedstreams containing $CO_2$ and the second gas component. The second component can comprise one or more of methane ($CH_4$) and nitrogen ($N_2$).

One example of a suitable process feedstream is a natural gas feed or stream, such as a natural gas feed produced at a petroleum production site, or a natural gas feed or stream from a gas field or shale gas formation. Natural gas feeds typically contain methane, optionally some larger hydrocarbons such as $C_2$-$C_4$ hydrocarbons, $CO_2$, and optionally one or more additional components such as $N_2$, $H_2S$, $H_2O$, and mercaptans. A natural gas feed may also contain one or more substances introduced as part of the process for extracting the natural gas at the production site. Examples of such substances can include glycols such as ethylene glycol, amines such as methyl diethyl amine, dimethyl disulfide, and combinations thereof.

Another example of suitable process feedstream can include a flue gas. Flue gas is understood herein to be the combustion products generated as a result of combusting fuels (e.g., coal, oil, natural gas, biofuels). A variety of processes can generate a flue gas containing $CO_2$ and small hydrocarbons such as $CH_4$. Depending on the source of the flue gas, it may also contain $H_2S$, $H_2$, $N_2$, $H_2O$, and/or other components that are gas phase at standard conditions. Components such as $CO_2$ and $N_2$ can act as diluents reducing the value of flue gas streams.

Yet another example of a suitable process feedstream is biogas. Biogas, the $CO_2$/$CH_4$ mixtures produced by the breakdown of organic matter, is a renewable fuel source with the potential to replace traditional fossil fuel sources. Removal of $CO_2$ from the crude biogas mixtures is one of the most challenging aspects of upgrading this promising fuel source to pipeline quality methane. Therefore, the use of adsorbents to selectively remove $CO_2$ from high pressure $CO_2$/$CH_4$ mixtures with a high working capacity and minimal regeneration energy has the potential to greatly reduce the cost of using biogas in place of natural gas for applications in the energy sector.

In some aspects, processes are provided for the separation of $CO_2$ from at least one other gas component in streams containing both $CO_2$ and a second component (e.g., $CH_4$, $N_2$) utilizing adsorbents comprising the MER-type zeolite in a swing adsorption process. The general term "swing adsorption process" as used herein shall be taken to include Pressure Swing Adsorption (PSA) processes, Temperature Swing Adsorption (TSA) processes, Pressure Purge Displacement Processes (PPSA), Rapid Cycle Pressure Swing Adsorption (RCPSA) processes, Rapid Cycle Temperature Swing Adsorption (RCTSA) processes, Rapid Cycle Pressure Purge Displacement Processes (RCPPSA) as well as combinations of these swing adsorption processes. The stream to be separated can be fed to the process in a substantially gaseous state.

MER-type zeolites exhibiting significantly large adsorptive loading ratios may be used in swing adsorption processes to effectively and economically separate $CO_2$ from a second component (e.g., $CH_4$, $N_2$) in streams containing both components. Each of these swing adsorption processes are comprised of a number of "steps" that include a variety of adsorption and desorption steps that in combination lead to a complete swing adsorption "cycle" that is periodically repeated. Since multiple adsorbent beds are typically used, their appropriate time synchronization leads to the continuous production of products. A complete swing adsorption cycle on a particular adsorbent bed, therefore, comprises all of the adsorption and desorption steps that are taken, beginning with the very first contacting of the feed gas mixture with the adsorbate-free or substantially adsorbate-free adsorbent and continuing through the last desorption stage that regenerates the adsorbent into its adsorbate-free or substantially adsorbate-free state and further including any additional re-pressurizing and/or purging steps that may occur thereafter to bring the "cycle" back to the first contacting of the feed gas mixture with the adsorbate-free or substantially adsorbate-free adsorbent which has begun the "cycle". At this point, the next swing adsorption "cycle" is started, and the cycle is subsequently repeated.

Typically, there is at least one adsorption step wherein a process feedstream is contacted with the adsorbent material in a swing adsorption process. The equivalent terms "process feedstream" or "inlet stream" as used herein in swing adsorption embodiments of the present invention is the mixed component stream comprising at least two components to be separated which is contacted with the adsorbent material during the adsorption cycle. During this step of the process, the process feedstream contacts the adsorbent material under certain process temperature and pressure conditions and as the process feedstream flows through the adsorbent material at least a portion of the "first component" (or "strongly adsorbed component") of the process feedstream is preferentially adsorbed by the adsorbent material with respect to a "second component" (or "weakly adsorbed component"). During this step an "effluent stream" (or "$CO_2$-lean product stream" herein) is drawn from the swing adsorption process wherein the total number of moles of the first component into the swing adsorption process is higher than the total number of moles of the first component out of the swing adsorption process during this adsorption step. Although it is not necessary, it is preferred that the molar concentration of the first component in the process feedstream be greater than the molar concentration of the first component in the effluent stream.

The swing adsorption process is also comprised of at least one desorption step wherein at least a portion of the first component that has been preferentially adsorbed by the adsorbent material is recovered in what is termed herein as a "desorbed stream" (or "$CO_2$-rich product stream" herein). During this step, the process conditions in the swing adsorption process are changed to allow at least a portion of the first component to be desorbed from the adsorbent material and collected as a "desorbed stream". This desorption can be induced by a pressure swing, a temperature swing, the introduction of a partial pressure purge displacement stream, or a combination thereof. In a preferred embodiment, the molar concentration of the first component in the desorbed stream is greater than the molar concentration of the first component in the process feedstream. In another preferred embodiment, the molar concentration of the first component in the desorbed stream is greater than the molar concentration of the first component in the effluent stream.

Although at least these two steps (i.e., adsorption and desorption) are required in the swing adsorption processes of the present disclosure, additional steps may be utilized in the swing adsorption processes. These steps can include con-current purge steps, counter-current purge steps, and/or multiple partial pressurization or depressurization steps. These additional steps may be utilized to improve first and/or second component recovery, improve first or second component purity, and/or obtain multiple product streams in addition to the effluent stream and desorbed stream described above.

The swing adsorption process can be a PSA process wherein the adsorbent material is comprised of a MER-type zeolite and the "first component" as described above is $CO_2$ and the "second component" as described above is one or more of $CH_4$ and $N_2$. In this PSA process, the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. This is accomplished in part by exposing the adsorbent material to lower partial pressure conditions in the desorption step than the partial pressure conditions in the adsorption step. This desorption can be further assisted by utilizing a purge gas to lower the partial pressure of the first component during the desorption step, a purge step, a partial pressurization step, or a partial depressurization step as described above.

The swing adsorption process can be TSA process wherein the adsorbent material is comprised of a MER-type zeolite and the "first component" as described above is $CO_2$ and the "second component" as described above comprises one or more of $CH_4$ and $N_2$. The TSA processes operate similar to the PSA processes above wherein the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. However, in the TSA processes, this is accomplished in part by exposing the adsorbent material to higher temperature conditions in the desorption step than the temperature conditions in the adsorption step. This desorption can be further assisted by utilizing a purge gas to lower the partial pressure of the first component and/or provide heating of the adsorbent material during the desorption step, a purge step, a partial pressurization step, or a partial depressurization step as described above.

It should also be noted that the steps of the PSA and TSA processes can be combined. In these combined processes, both pressure and temperature changes or "swings" are made between the adsorption steps and desorption steps of the process, resulting in a desired separation of at least a portion of the first component from the second component of the mixed component process feedstream fed to the inlet of the PSA/TSA process.

The MER-type zeolite may be incorporated into an adsorption swing process in many structural forms and/or in combination with additional components. The MER-type zeolite may be incorporated as crystallites of preferred size and shape of substantially uniform dimensions or with dimensions suitably distributed according to a preferred distribution. The crystallites may be used directly as produced in the synthesis steps or be more preferably formulated into larger aggregates or incorporated into a structured or matrix material to provide form, stability, and/or in combination with other complementary co-adsorbent materials that can fulfill a variety of other beneficial functions to the overall process. Examples include incorporating the MER-type zeolite with a binder material to form a matrix comprising a binder material selected from a crystalline polymer, a non-crystalline polymer, an epoxy, a thermoplastic, a clay, a silica-containing material, an alumina-containing material, and a titania-containing material. The binder material may also exhibit either a microporous or a mesoporous structure. Additionally, it may be advantageous to add suitably chosen additives into this binder material. These additives can be used to improve the adsorption/desorption and transport properties of the selected components within the ZIF materials. Examples of these additional additives include zeolites and microporous crystalline materials such as pure silicates, silicoaluminophosphates, and aluminophosphates. Other additives such as metals or other high heat capacity and high heat conductivity materials may also be incorporated into the matrix to assist in the capture and transfer of at least a portion of the heat that is generated during the exothermic adsorption step(s) of the swing adsorption process, thereby shortening the duration of the cycling process, increasing throughput, and further improving the overall efficiency of the MER-type zeolite for adsorbing the select component or components.

When the MER-type zeolite is incorporated with a binder, the adsorbent material can be formulated into optimal geometric shapes or be applied onto supporting substrates which further improve the durability of the adsorbent and the rate at which the selected adsorbing components are brought into contact with the adsorption sites of the MER-type zeolite Examples include beads, extrudates, formed pellets, structured beds, monoliths and hollow fibers, as well as coatings applied to plates or monolithic structures fibers or hollow fibers. Depending upon the specific situation, inlet stream composition as well as product stream compositions, process conditions and equipment design, certain structures and/or matrix compositions can provide improved separation efficiencies and/or selectivities for the overall process.

The MER-type zeolite can be used in PSA, PPSA, RCPSA, RCPPSA, TSA or combined cycle conditions at gas feed pressures in a range of from 0.03 to 35 MPa (e.g., 0.69 to 14 MPa, or 1.7 to 10 MPa). Operating gas feed temperatures may be in a range of from −18° C. to 399° C. (e.g., 38° C. to 316° C., or 66° C. to 260° C.).

In other aspects, the MER-type zeolite can be incorporated into a membrane process for the selective separation of $CO_2$ from a second component (e.g., $CH_4$, $N_2$), in streams comprising a mixture of these components. The MER-type zeolite can be incorporated within or coated onto an inorganic substrate or a polymer material and utilized in a membrane separation process, thereby producing a "MER-containing membrane". The MER-type zeolite of the membrane has a net permeation affinity for $CO_2$ over the second component. The permeation rate can be typically described in terms of two multiplicative factors, one related to the diffusion rate and another related to the adsorption loadings of the components of the mixture on the MER-type zeolite. With respect to this latter factor, a MER-type zeolite incorporated into the membrane which has a higher adsorptive loading ratio for $CO_2$ over the second component, improves the concentration gradient for $CO_2$ either at the membrane surface (if coated onto the membrane surface) and/or in the membrane (if incorporated into the membrane matrix). This improved concentration gradient enhances the selective permeation of $CO_2$ relative to the second component $CH_4$ through the membrane, resulting in an improved recovery of $CO_2$ in the membrane permeate stream.

In this embodiment, a process feedstream comprising $CO_2$ and the second component contacts a first side of a MER-type zeolite membrane and at least a portion of the process feedstream permeates through the membrane and is retrieved from a second side of the membrane material as a permeate stream. The permeate stream is obtained from the second side of the membrane and the permeate stream thus obtained has a higher vol % of $CO_2$ than the process feedstream. The equivalent terms "process feedstream" or "inlet stream" as used herein in membrane process embodiments of the present invention is the mixed component stream comprising at least two components to be separated which is contacted with the first side of the MER-containing membrane. It should be noted that in some embodiments, a "sweep stream" may be utilized on the permeate side of the MER-containing membrane in the membrane separation process of the present disclosure. It should also be noted that the term "permeate stream" as used herein and its composition properties are measured based solely upon the composition of the stream that permeates through the MER-containing membrane. If any additional stream, such as a sweep stream, is added on the permeate side of the membrane process, the composition of this sweep stream must be excluded from the compositional analysis of the permeate stream.

At least one retentate stream is also obtained from the first side of the membrane which has a lower vol. % of $CO_2$ than the process feedstream that initially contacts the membrane. In this manner, a separation of components is made resulting in a higher value for the two separated streams (i.e., the retentate and the permeate streams) than the original mixed stream that is fed to the membrane separations process. In preferred embodiments, the MER-type zeolite utilized in the membrane process has an adsorptive loading ratio for $CO_2$ over the second component of at least about 10 (e.g., at least 20, or at least about 25).

The membranes can be asymmetric and can be comprised of several layers of different materials. To improve the mass transfer characteristics of these asymmetric membrane structures, one or more of these layers can be a porous material. A thin selective layer imparts most of the molecular selectivity in the asymmetric membrane structure and this selective layer can contains the MER-type zeolite. On the feed side molecules are selectively adsorbed in the selective layer and on the permeate side the molecules are desorbed. The selective MER-containing layer can optionally include other materials. One of the materials that can be present in the MER-containing layer is a polymer. When the MER-containing layer contains more than 10 vol. % of another material, the selective layer is called a mixed matrix. To mitigate the effect of any defects or pinholes in the selective layer, a reparation coating or reparation layer can be incorporated in the membrane structure.

The MER-containing membrane can be part of a membrane module that includes a pressure housing. Examples of MER-containing membrane structures that can be incorporated into the membrane module are hollow-fiber membrane structures, flat sheet membrane structures, and monolithic membrane structures. The membrane module can contain seals to isolate the retentate and permeate zones of the module and to prevent flow bypass or cross-contamination of the retentate stream(s) to the permeate stream(s). The seals may also serve as a device for holding the membrane in place within the membrane module.

Gas purification can be effected by passage of a gas mixture through a membrane at a temperature of from 25° C. to 200° C. and a pressure of from 345 kPa and 34.5 MPa.

In order to separate two components from a mixture, an adsorption capacity (e.g., in mol/kg) for the first component must be greater than the adsorption capacity (e.g., in mol/kg) of the second component.

As understood in the art, an adsorptive loading ratio of a material for one component over another component, for example component A over component B, can be determined by separately measuring the uptake capacity (e.g., in mol/kg) of the material for component A and component B at similar temperatures. The adsorptive loading ratio for component A over component B=(uptake capacity for component A/uptake capacity for component B). The MER-type zeolite can have an adsorption loading ratio of at least 1 (e.g., at least 10, at least 15, at least 20, 1 to 50, 5 to 50, 10 to 40, or 15 to 30) at 10° C. to 50° C. (e.g., 30° C.) for: (i) $CO_2$ over $CH_4$; and/or (ii) $CO_2$ over $N_2$.

MER-type zeolites, e.g., prepared by the method described herein, such as those at least partially dehydrated at an activation temperature of 150° C. or greater, may have unique $CO_2$ sorption capacities. For example, under conditions comprising a temperature of 30° C., the MER-type zeolite may sorb: (i) at least 2.0 mol of $CO_2$ per kilogram of MER-type zeolite (e.g., at least 2.1 mol/kg) at a $CO_2$ partial pressure of 1 bar (100 kPa) (ii) at least 2.0 mol of $CO_2$ per kilogram of MER-type zeolite (e.g., at least 2.1 mol/kg, at least 2.2 mol/kg, or at least 2.3 mol/kg) at a $CO_2$ partial pressure of 2 bar (200 kPa); and/or (iii) at least 2.0 mol of $CO_2$ per kilogram of MER-type zeolite (e.g. at least 2.1 mol/kg, at least 2.2 mol/kg, or at least 2.3 mol/kg) at a $CO_2$ partial pressure of 3 bar (300 kPa). Though there is not necessarily an upper limit on $CO_2$ sorption capacity, at the partial pressures listed here, MER-type zeolite can typically sorb up to about 3 mol/kg $CO_2$.

The $CO_2$-rich stream produced by the separation processes of the present disclosure can have a $CO_2$ content of at least 75 vol. % (e.g., at least 85 vol. %). The $CO_2$-lean product streams can have a $CO_2$ content of less than 5 vol. % (e.g., less than 2 vol. %), which may be particularly beneficial when the $CO_2$-lean stream is released to the atmosphere as an exhaust stream.

The $CO_2$-rich stream produced by processes of the present disclosure may be further sequestered at high pressures in an underground formation. The term "sequestered" is defined herein as the confinement of a waste stream containing at least 50 vol. % of $CO_2$ in an underground structure, or repository, or in the deep ocean at pressures of at least 3.45 MPa. It is desirable that the underground formation be located near the production site of the natural gas to minimize transportation costs. Underground formations that are suitable for sequestration of $CO_2$ include aquifers that have a top seal that prevents significant loss of the injected components, oil reserves, gas reserves, depleted oil reserves, and depleted gas reserves.

EXAMPLES

The following illustrative examples are intended to be non-limiting.

Example 1

2.77 g of deionized water, 1.49 g of a 45% KOH solution, and 1.80 g of CBV300 Y-zeolite powder (Zeolyst International, $SiO_2/Al_2O_3$ molar ratio=5.1) were mixed together in a Teflon liner. The resulting gel was stirred until it became homogeneous. The liner was then capped and placed within a Parr steel autoclave reactor. The autoclave was then placed in an oven and the heated at 150° C. for 2 days. The solid products were recovered by centrifugation, washed with deionized water and dried at 95° C.

Figure 1:
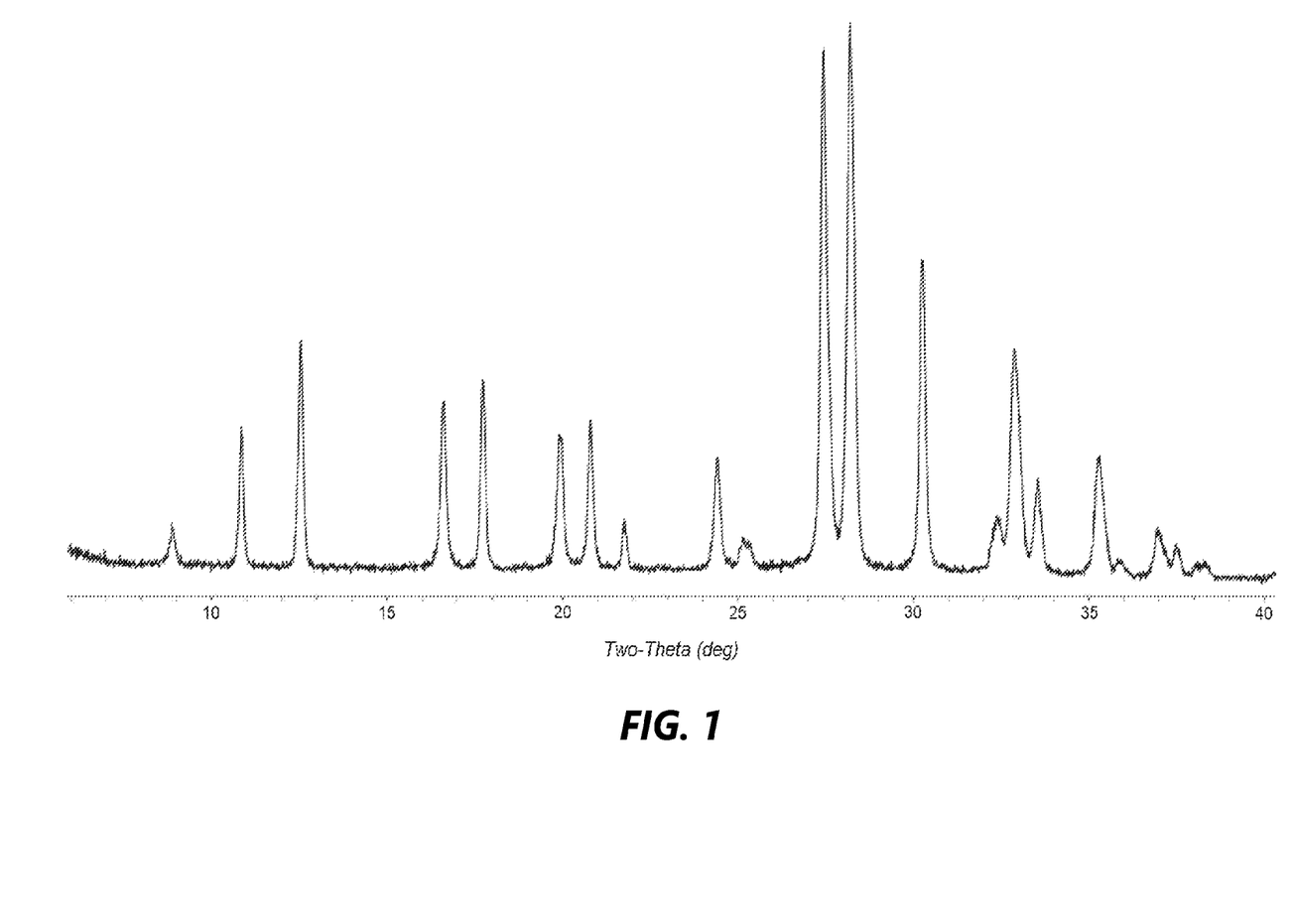
FIG. 1 shows the powder X-ray diffraction (XRD) pattern of the product of Example 1.
Figure 2:
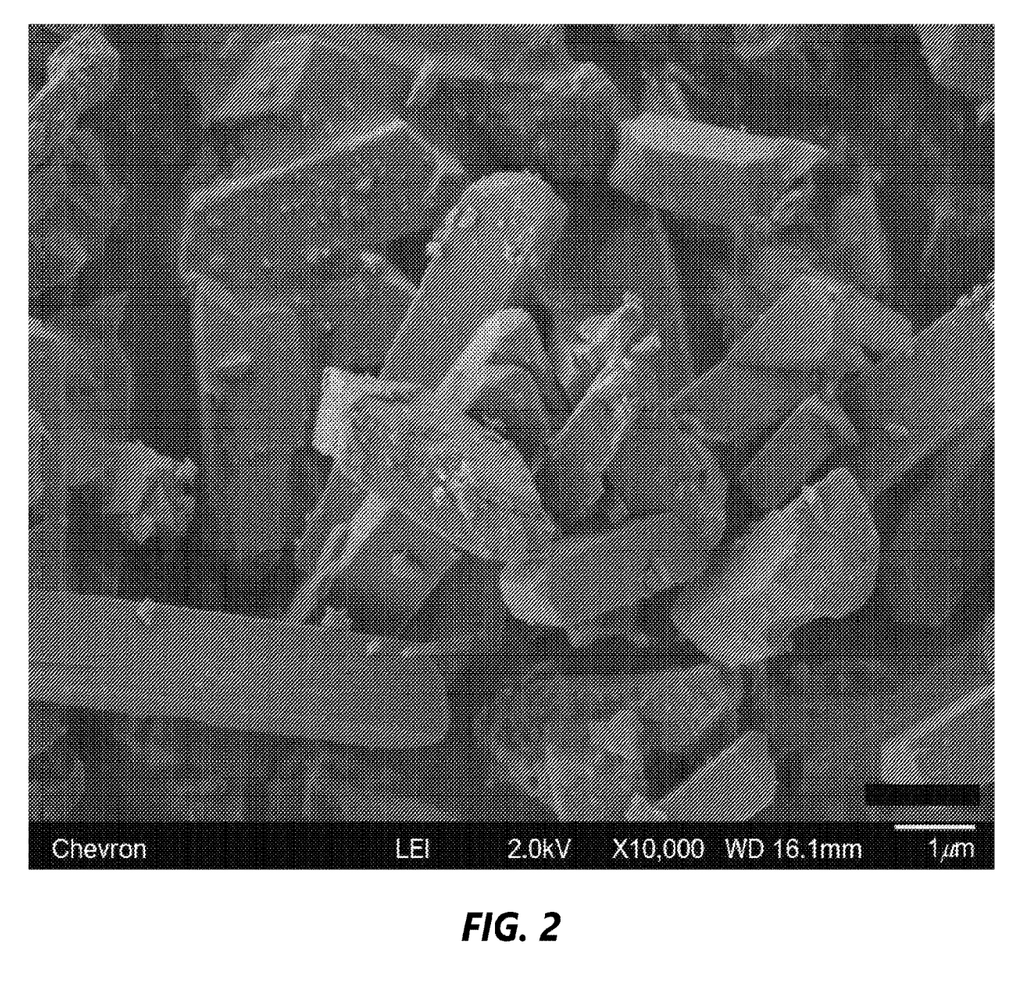
FIG. 2 is a Scanning Electron Micrograph (SEM) image of the product of Example 1.

Powder XRD of the as-synthesized product gave the pattern indicated in FIG. 1 and showed the product to be pure MER-type zeolite. A SEM image of the as-synthesized product is shown in FIG. 2 indicating a uniform field of crystals which exhibit a stick-like morphology. Conventional MER-type zeolite crystals typically exhibit needle-like morphology.

The product had a $SiO_2/Al_2O_3$ molar ratio of 4.8, as determined by Inductively Coupled Plasma-Mass Spectrometry (ICP-MS).

Example 2

Figure 3:
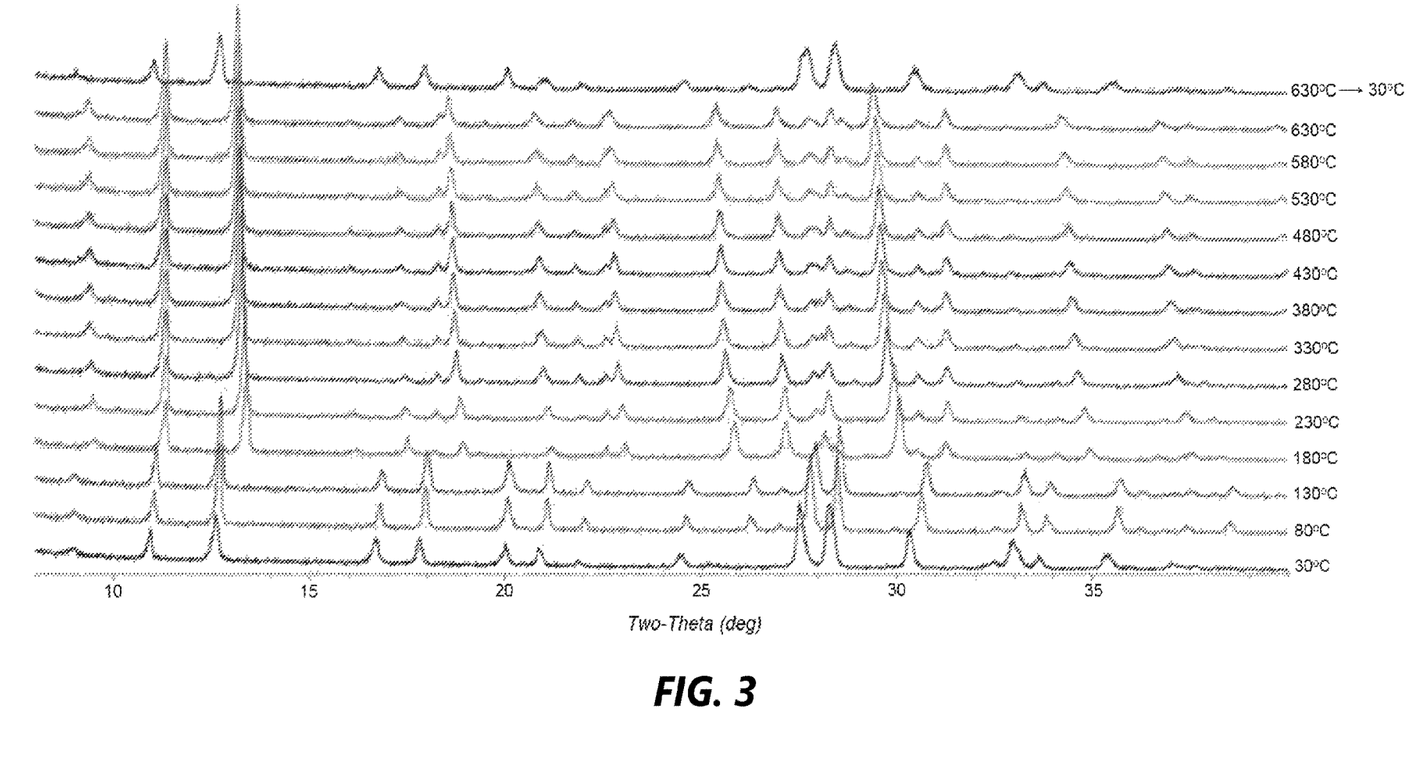
FIG. 3 shows the in-situ powder XRD pattern of the MER framework type zeolite product of Example 1 taken at different temperatures.

In-situ high-temperature powder XRD data were collected on the MER-type molecular sieve product of Example 1. A powder XRD pattern was first collected at 30° C. and then at 50° C. increments until a temperature of 630° C. was reached. A final powder XRD pattern was collected after the sample was cooled to 30° C. from 630° C. FIG. 3 shows the in-situ powder XRD pattern of the MER-type molecular sieve product of Example 1 taken at different temperatures. The in-situ powder XRD patterns shown in FIG. 3 demonstrate that the sample undergoes a phase transition when the temperature is above 130° C. and that the phase transition is reversible upon cooling of the sample.

Example 3

The adsorption capacities of the K-MER molecular sieves of Example 1 for $CO_2$, $CH_4$ and $N_2$ were tested using a High-Pressure Volumetric Analyzer (HPVA) 200-4 port volumetric system. Prior to the measurements, the molecular sieves were outgassed under vacuum (e.g., not less more than about 0.01 torr).

Figure 4:
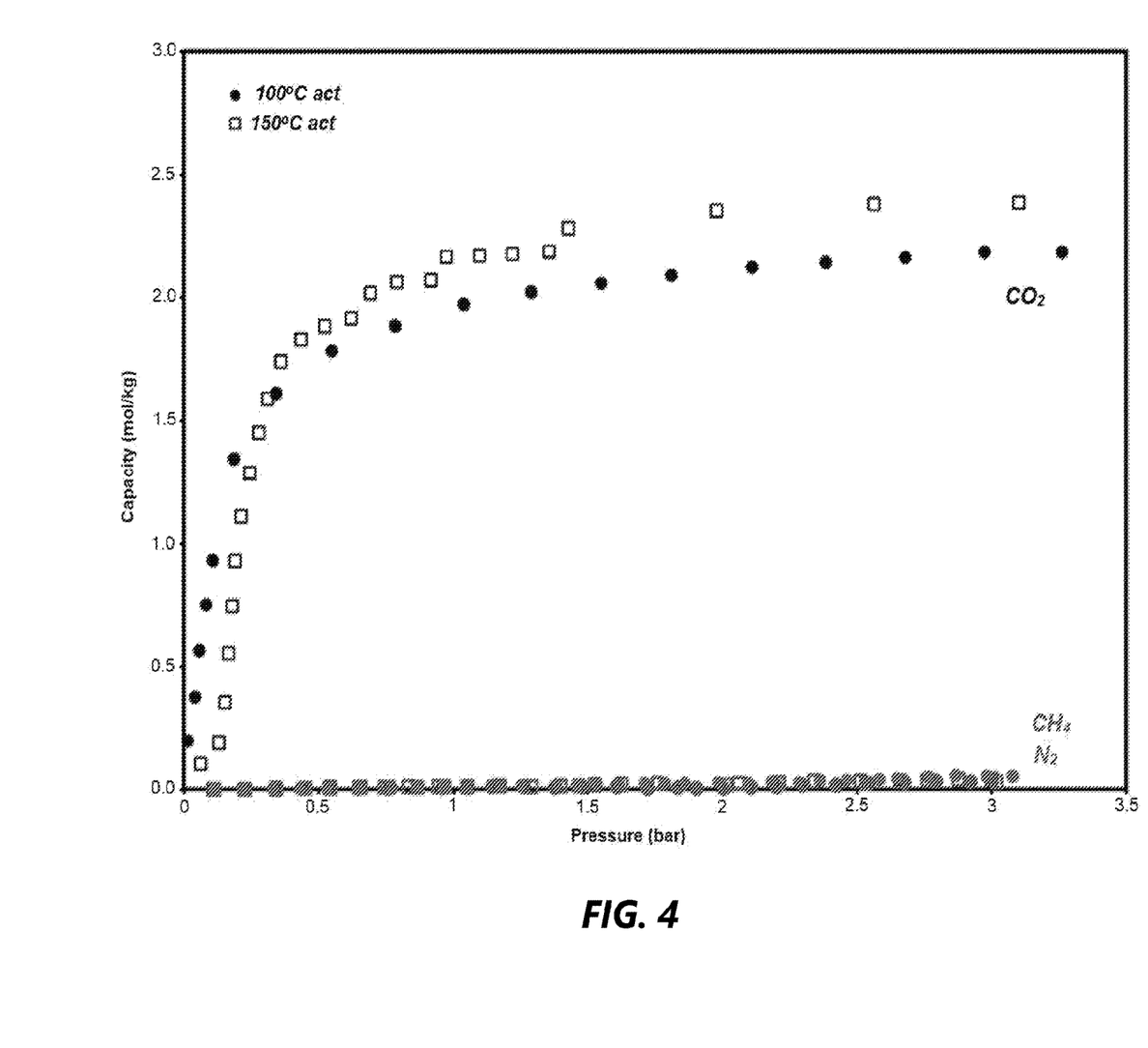
FIG. 4 shows the $CO_2$, $CH_4$ and $N_2$ adsorption isotherms at 303 K for the MER framework type zeolite product of Example 1 with zeolite activation at 100° C. and 150° C.

FIG. 4 shows the $CO_2$, $CH_4$ and $N_2$ adsorption isotherms at 303 K for the MER framework type zeolite product of Example 1 with zeolite activation at 100° C. and 150° C. At an activation temperature of 100° C., where a phase transition as described in Example 2 is not expected to occur, the $CO_2$ adsorption isotherm shows an adsorption capacity typical of small pore zeolites. At an activation temperature of 150° C., where a phase transition as described in Example is expected to occur, there is a marked change in the $CO_2$ adsorption isotherm showing improved $CO_2$ adsorption, while the $CH_4$ and $N_2$ isotherms exhibit no substantial change.

The improved $CO_2$ adsorption properties observed for the present K-MER-type molecular sieve may be utilized for easier recovery of $CO_2$ in a typical pressure swing adsorption process. Because the saturation capacity is higher, but the low pressure adsorption region occurs at approximately an order of magnitude high partial pressure, a savings in energy cost (e.g., mechanical, thermal) may be realized during the regeneration process of an adsorption-based separation process.

The invention claimed is:

1. A potassium-form MER framework type zeolite prepared by a method consisting essentially of:
   (a) providing a reaction mixture comprising:
      (1) a FAU framework type zeolite;
      (2) a source of potassium cations associated with anions;
      (3) a source of hydroxide ions; and
      (4) water; and
   (b) subjecting the reaction mixture to crystallization conditions sufficient to convert the FAU framework type zeolite to a potassium-form MER framework type zeolite, which is essentially free of an extra framework cation other than potassium;
   wherein the reaction mixture has a composition, in terms of molar ratios, as follows: $SiO_2/Al_2O_3$ 4 to 10, $[K^+]/SiO_2$ 0.30 to 0.80, $[OH^-]/SiO_2$ 0.30 to 0.80, and $H_2O/SiO_2$ 5 to 20; and with the potassium-form MER framework type zeolite having a stick-like morphology, wherein the potassium is present as $K^+$ in extra-framework locations and the potassium-form MER framework type zeolite is essentially free of an extra-framework cation other than potassium.

2. The potassium-form MER framework type zeolite of claim 1, having a molar ratio of $SiO_2/Al_2O_3$ in a range of 4 to 10.

3. The potassium-form MER framework type zeolite of claim 1, wherein potassium is present, on an anhydrous basis, in an amount of from 0.1 to 5 wt. %, based on the weight of the potassium-form MER framework type zeolite.

4. The potassium-form MER framework type zeolite of claim 1, having a mean crystal size of 1 to 10 μm.

5. The potassium-form MER framework type zeolite of claim 1, having a mean aspect ratio of 2 to 6.

6. The potassium-form MER framework type zeolite of claim 1, in its as-synthesized form.

7. The potassium-form MER framework type zeolite of claim 1, wherein the reaction mixture has a composition, in terms of molar ratios, as follows:
   $SiO_2/Al_2O_3$ 4 to 7, $[K^+]/SiO_2$ 0.50 to 0.70, $[OH^-]/SiO_2$ 0.50 to 0.70, and $H_2O/SiO_2$ 5 to 15.

* * * * *